United States Patent
Ruello et al.

[11] Patent Number: 6,067,394
[45] Date of Patent: May 23, 2000

[54] STRUCTURES OF OPTICAL FIBER CABLES SELF-REINFORCED AGAINST COMPRESSION

[75] Inventors: Yves Ruello, Lannion; Jean-Pierre Louboutin, Trebeurden; Annie Morgand, Lannion, all of France

[73] Assignee: France Telecom, S.A., Paris, France

[21] Appl. No.: 09/151,864

[22] Filed: Sep. 11, 1998

[30] Foreign Application Priority Data

Sep. 11, 1997 [FR] France ..................... 97 11536

[51] Int. Cl.⁷ ........................................... G02B 6/44
[52] U.S. Cl. ................... 385/106; 385/100; 385/102
[58] Field of Search .................... 385/106, 100–114

[56] References Cited

U.S. PATENT DOCUMENTS

| | | | |
|---|---|---|---|
| 4,318,588 | 3/1982 | Zeidler et al. | 350/96.23 |
| 5,408,564 | 4/1995 | Mills | 385/128 |

FOREIGN PATENT DOCUMENTS

| | | |
|---|---|---|
| 0 328 409 | 8/1989 | European Pat. Off. . |
| 0 410 622 | 1/1991 | European Pat. Off. . |
| 0 428 036 | 5/1991 | European Pat. Off. . |
| 0 545 622 | 6/1993 | European Pat. Off. . |
| 2559592 | 8/1985 | France . |
| 2728694 | 6/1996 | France . |
| 2747201 | 10/1997 | France . |
| 32 32 108 | 3/1984 | Germany . |

*Primary Examiner*—Phan T. H. Palmer
*Attorney, Agent, or Firm*—Nilles & Nilles, S.C.

[57] ABSTRACT

A modular optical transmission cable which has several reinforcement and optical modules, each optical module having:

a sheathed optical fiber, coated with:
  an intermediate decoupling layer, and with
  a rigid shell forming a microcarrier,
  a reinforcement module being associated with an optical module, the modules being molded in an external sheath. A flexible reinforcement module is associated with at least one optical module that is self-reinforced against compression in order to obtain a cable having high flexibility combined with high compressive strength. The disclosure can be applied in the field of optical fiber cables and especially that of the reinforcement structures of such cables and fibers.

17 Claims, 5 Drawing Sheets

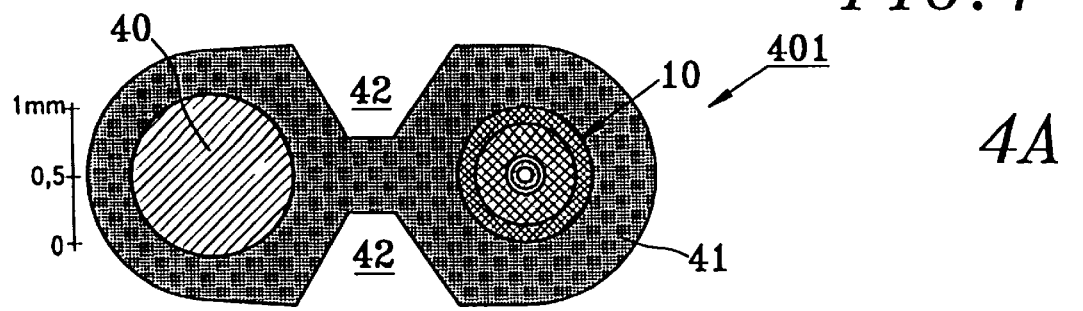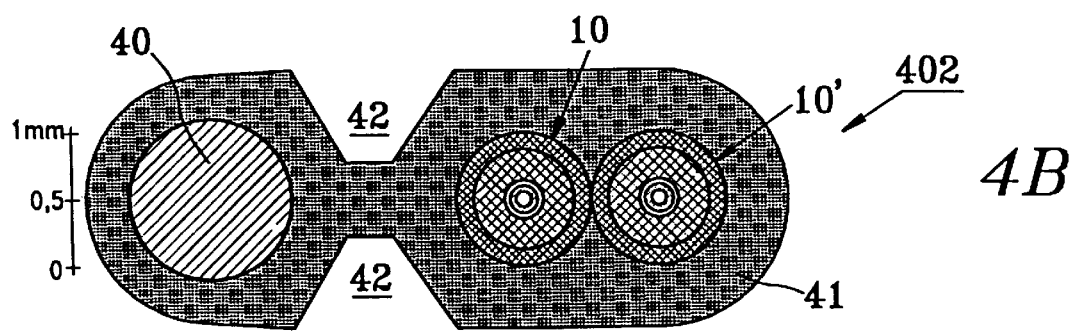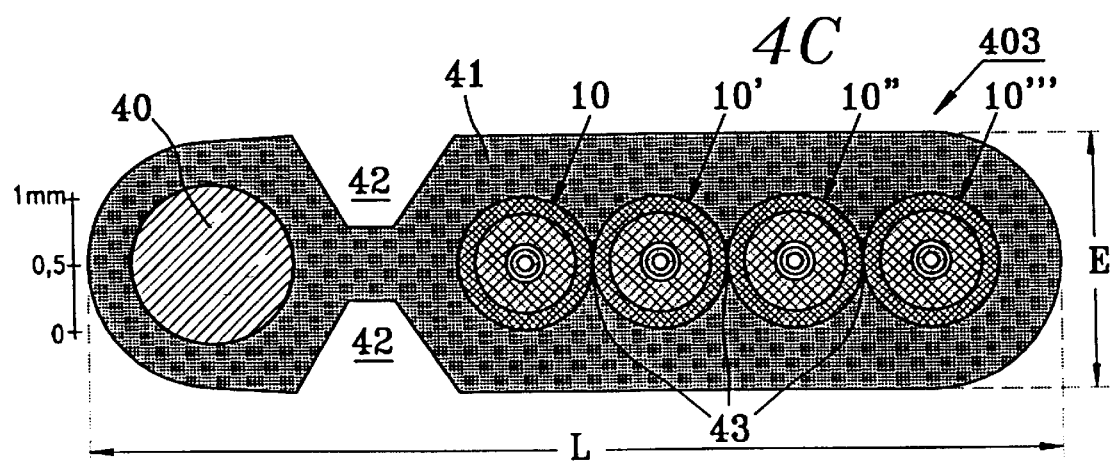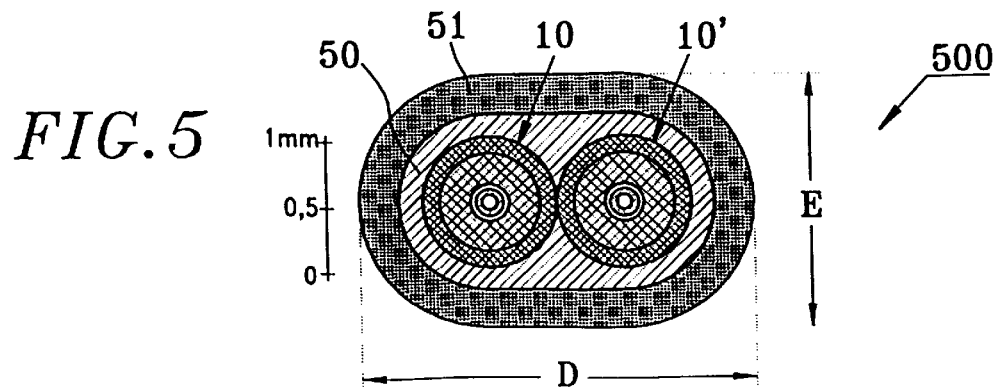

FIG. 6
6A
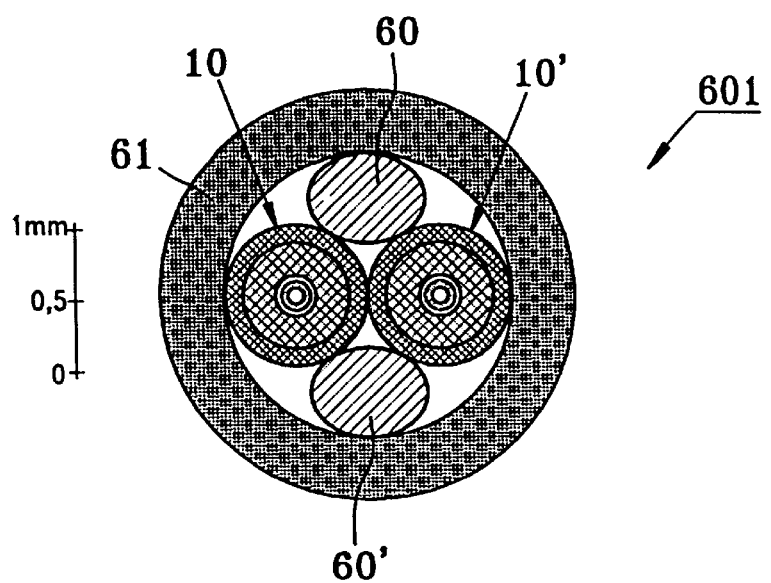
6B
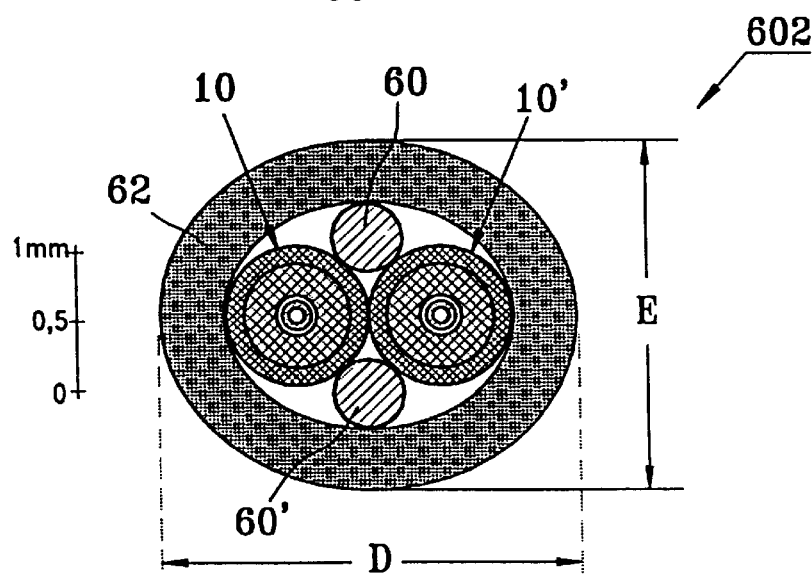
6C
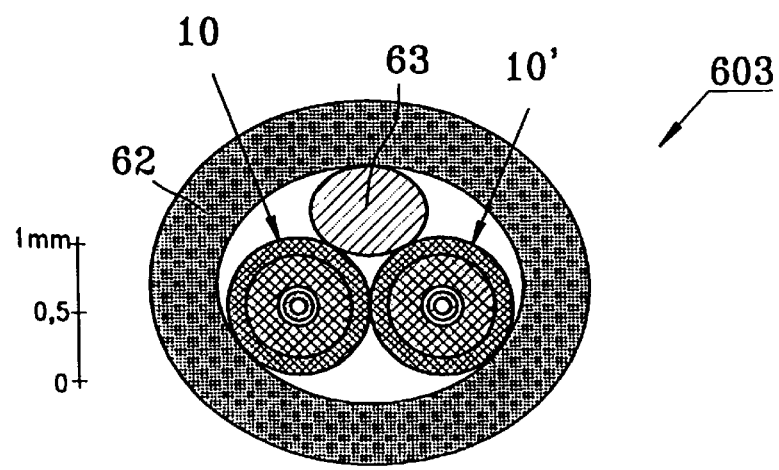

FIG. 9
9A
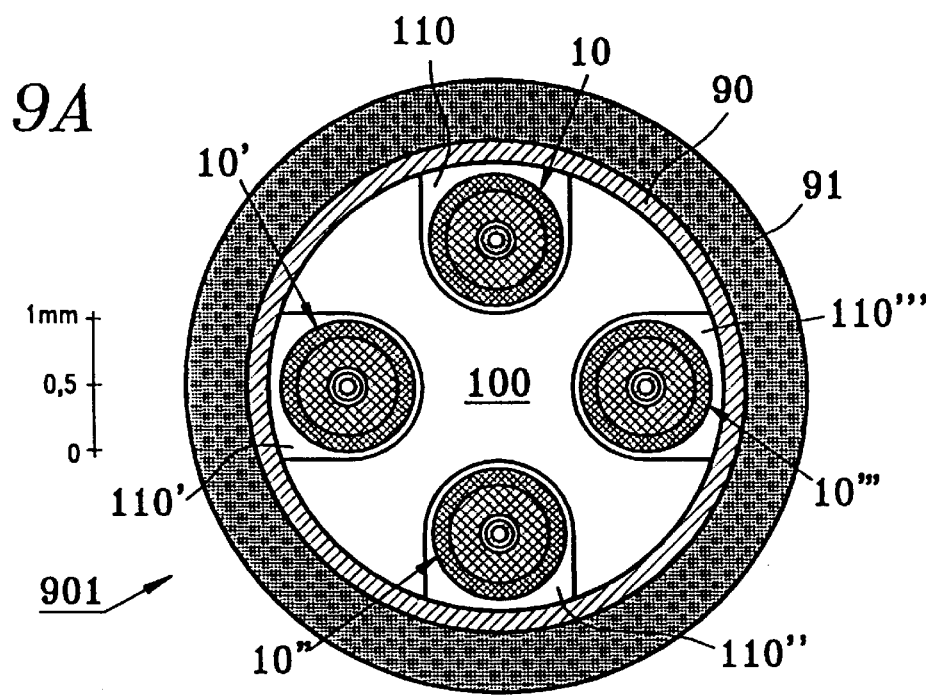
9B
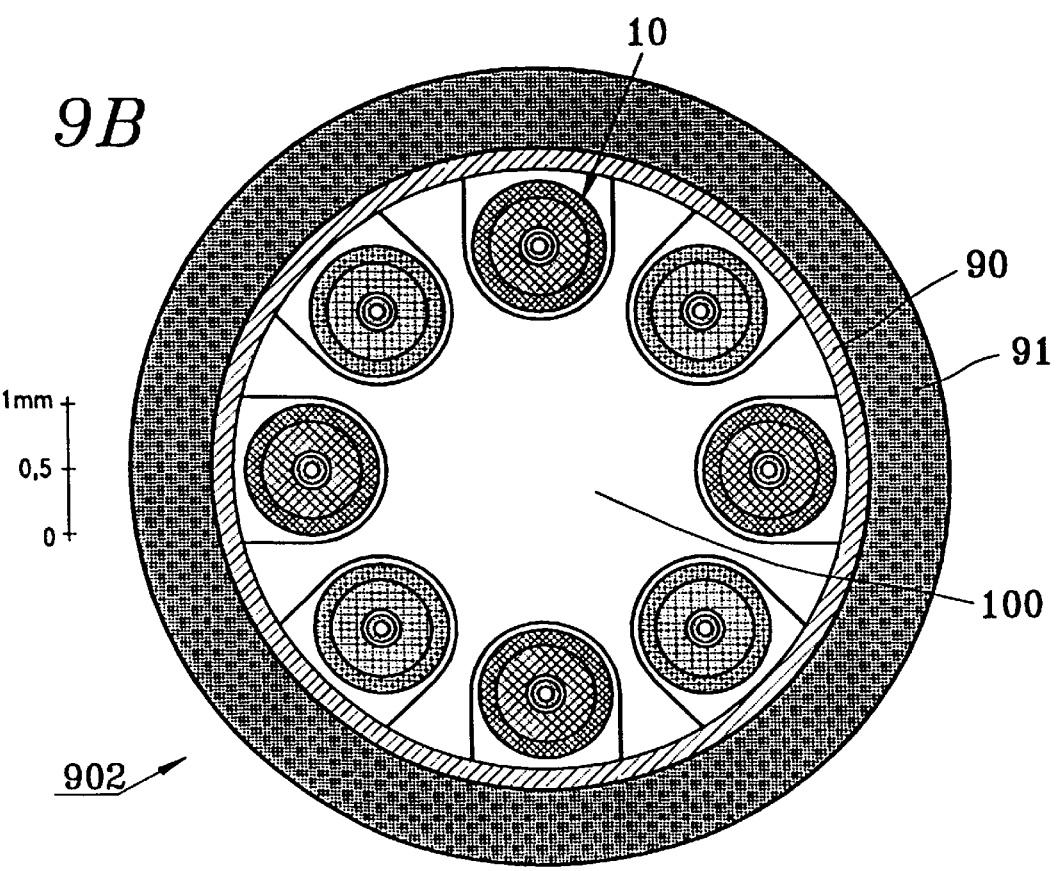

STRUCTURES OF OPTICAL FIBER CABLES SELF-REINFORCED AGAINST COMPRESSION

BACKGROUND OF THE INVENTION

1. Field of the Invention

The present invention relates to the field of optical fiber cables and especially to the reinforcement structures of such cables and fibers.

Optical fibers used for telecommunications by optical signals are elements based on silicates (glass or quartz) that are particularly brittle and poorly withstand weight, tensile and compressive forces. There are known ways of using reinforcement structures to form an optical fiber cable designed to cover long-haul and short-haul communications.

2. Description of the Prior Art

The patent FR-A-2 728 694 filed on behalf of the present Applicant teaches an elementary reinforcement structure in which at least one optical fiber is inserted into a rigid shell called a microcarrier to form an optical module (also called a micromodule) that is reinforced in order to limit the curvature of the fiber and the attenuation of the optical signals.

The patent application No. FR-A 2 747 201 filed on behalf of the present Applicant teaches a more evolved structure in which optical modules (micromodules) are associated with rigid reinforcement modules (micro-reinforcements) and molded in a polymer sheath to form a cable. The application describes essentially flat cables in which the micromodules and the micro-reinforcements are coplanar, the sheathed cable having the form of a ribbon.

The documents DE-A1-32 32 108, EP-A2-0 328 409, EP-B1-0428036 describe other structures of reinforced cables with coplanar optical modules.

The known cables have the drawback of high rigidity related to the structures designed to withstand compressive and tensile strains.

Another drawback specific to cable structures in ribbon form is that they get twisted on curved paths with small radius.

Such drawbacks rule out domestic applications as domestic cables have to withstand specific mechanical strains due to the low radii of curvature in the boxes, internal wiring systems, thermal shock and overhead wiring with elongation.

SUMMARY OF THE INVENTION

It is an object of the invention to obtain an optical fiber cable without the above-mentioned drawbacks that is especially suited to the specific characteristics of domestic distribution.

This object is achieved according to the invention by means of a modular optical fiber cable structure. The structure associates at least one flexible reinforcement module with a small number of optical modules. Each optical module is self-reinforced against compression, the flexible reinforcement module being simply resistant to tensile forces to preserve the overall flexibility of the cable.

Preferably, the reinforcement module is formed by wicks of non-hardened microfibers, unlike the known rigid reinforcements which comprise wicks of mechanical reinforcement fibers assembled by means of thermo-hardening resins. With wicks of non-hardened fibers, the reinforcement module works essentially when the cable is subjected to a tensile stress. As for compressive strains, they are borne essentially by the self-reinforced optical module.

The invention provides for the making of a modular optical transmission cable comprising several reinforcement and optical modules, each optical module comprising:
- a sheathed optical fiber, coated with:
- an intermediate decoupling layer, and with
- a rigid shell forming a microcarrier,
- a reinforcement module being associated with an optical module, the modules being molded in an external sheath,
- with the specific feature according to which a flexible reinforcement module is associated with optical modules that are self-reinforced against compression in order to obtain a cable having high flexibility combined with high compressive strength.

According to a preferred embodiment of the invention, the reinforcement modules are formed by wicks of microfibers that have not been hardened by means of resin.

Preferably, the wicks of the reinforcement module are covered on the surface with a hot-melt type adhesive material.

According to an alternative of the preferred embodiment, the reinforcement module wicks have interstices filled with expanding powder or hot-melt in order to prevent any penetration of moisture.

It is planned that an optical module will furthermore comprise a final coating of anti-adhesive material with a thickness of about 100 to 200 microns in order to enable a sliding of the optical module into the external sheath, the coating or the sheath being preferably flame-retardant.

Various geometries of cables are furthermore planned according to the invention.

BRIEF DESCRIPTION OF THE DRAWINGS

Other features, aims and advantages of the present invention shall appear from the following description and from the appended drawings, given purely by way of non-restrictive examples.

Of the appended drawings:

FIG. 4 shows cross-sectional views of planar cables according to a third embodiment of the invention, three monofiber, bifiber and tetrafiber variants being illustrated respectively in FIGS. 4A, 4B and 4C, FIG. 5 shows a cross-sectional view of a bifiber cable according to a fourth embodiment of the invention, FIG. 6 shows cross-sectional views of cylindrical bifiber cables according to a fifth embodiment of the invention, three variants being illustrated in FIGS. 6A, 6B and 6C, FIG. 9 shows cross-sectional views of rod-type cables according to an eighth embodiment of the invention, an embodiment of a tetrafiber cable and an embodiment of an octofiber cable being illustrated respectively in FIGS. 9A and 9B.

MORE DETAILED DESCRIPTION

A distinction will be made hereinafter in the description between two types of fibers, optical fibers and reinforcement fibers which, apart from their texture, have different functions, the former being designed to transmit optical signals while the latter have a mechanical function of reinforcing the former and of withstanding the strains exerted on the cable in general.

This distinction exists in the optical module and the reinforcement module forming the modular optical transmission cable.

However, according to the invention, it is planned to adopt optical modules which themselves have a reinforcement structure enabling them to withstand compressive strains.

Figure 1:
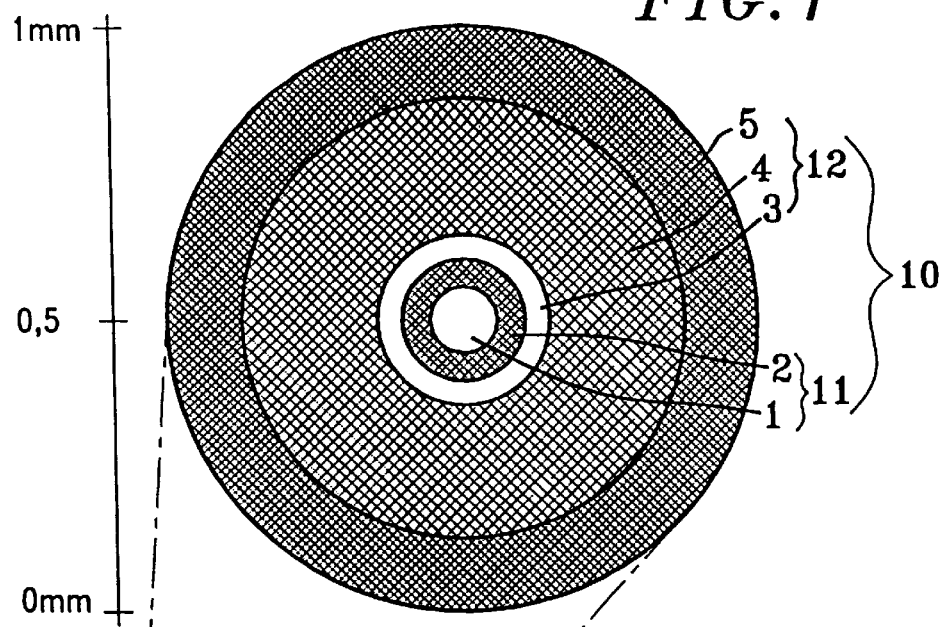
FIG. 1 shows a diagrammatic cross-sectional view of an elementary optical module implemented according to the invention.

FIG. 1 thus illustrates the elementary structure of an optical module 10 that is self-reinforced against compression. The optical module 10 is formed by a micromodule 11, a thin layer 3 of decoupling material and a rigid shell 12 called a microcarrier.

The optical fiber 1 of the micromodule 11 is a monomode or multimode silica guide typically having a diameter of 0.125 mm, preferably covered with a sheathing 2. The sheathed fiber 11 has for example a diameter of 0.25 mm.

The intermediate decoupling layer 3 is formed by a formulation of thermoplastic polymer.

The microcarrier 12 consists of a shell 4 preferably covered with another thermoplastic sheath 5.

An optical modular structure 10 of this kind is similar to the micromodule described in the patent FR-2 728 694.

It will be noted however that the shell 4 preferably consists of a composite material based on polymer reinforced fibers and that its diameter reaches for example 0.9 mm. The diameter of the optical module 10 is more generally in the range of 0.7 to 1 mm and reaches 1.2 mm with the alternative of a final sheathing coat 5.

The composite material is formed by glass microfibers with a diameter of 5 to 10 microns assembled in wicks and hardened with resin to form a rigid shell 4. The resin is preferably formed by polyester, vinylester, epoxy or polyurethane type polymers.

Thus a rigid shell 4, capable of advantageously absorbing compressive strains, is obtained.

Indeed, the thickness of a composite shell 4 of this kind endows the optical module with yield strength in the range of 150 to 400 N measured for an elongation of 1% and a crushing strength of over 15,000 Nm$^{-1}$. It is furthermore noted that a kinking effect appears only at a radius of curvature of less than 15 mm. It will further be noted that, with an optical fiber commercially available under the reference G652 or a similar fiber, the optical attenuation undergoes variations of less than 0.1 dB in a temperature range of +70° C. to −10° C., the variations remaining smaller than 0.5 dB between −10° C. and −30° C.

However, the values of the technical characteristics to be achieved for overhead optical cables are higher. By way of an indication, it is sought to obtain a yield strength of at least 500 N measured for an elongation of 0.3%.

The invention then provides for the constitution of a cable by associating one or more optical modules that are self-reinforced against compression with one or more flexible reinforcement modules, a flexible reinforcement module being essentially designed to withstand tensile stresses.

An arrangement of this kind is in contrast to the known structures of optical cables in which the reinforcements alone have to bear all the mechanical strains and have to be rigid to withstand compressive and tensile strains.

One advantage of the structure according to the invention is the flexibility of the cable obtained. Indeed, the most rigid element of the structure, namely the shell 4, has a reduced diameter and, by mechanical principles, the effect of this element on the rigidity of the cable is reduced to the minimum.

Another advantage of the cable structure according to the invention is the lightness of the cable as a result of the adoption of flexible reinforcement modules. Unlike the known reinforcements which are charged with polymer resin and sized to withstand compressive strains, a flexible reinforcement module is preferably formed by wicks of microfibers not hardened by means of resin and is therefore lighter.

The reinforcement module is generally formed by microfibers linked together in the form of wicks without bonding or hardening by means of resin.

The microfibers are formed by a material with a high Young's modulus, for example carbon, aramide, ceramic, polymers, E, R, S type glasses or a combination of fibers of such materials.

The microfibers have a diameter close to a micrometer but the wicks formed may be of various dimensions. The number and the size of the microfiber wicks are chosen so that the strength R of a monomodule cable is preferably greater than 170,000 N, the strength R being given by the following formula:

R=E.S where E is the Young's modulus,
and S is the area actually occupied by the wicks of fibers on a cross-section of the module.

Preferably, the microfibers are subjected to surface treatment to reveal free chemical groups having a function of attracting the fibers mutually (with bonds by hydroxyl radicals). Furthermore, the wicks of the shaped module are preferably covered on the surface with a hot-melt type adhesive material that is hot-deposited after the shaping of the wicks. The term hot-melt is used to qualify any heat-fusible bonder and the technique of hot bonding known to those skilled in the art. The adhesive material is formed for example by vinylacetate ethylene, polyamide, neoprene, nitrile rubber or a combination of these materials. The fibers are thus moderately bound.

One advantage of a reinforcement module of this kind based on non-hardened fibers is that it withstands tensile forces without harming the flexibility of the cable.

Since the wicks of fibers are not filled with resin, the invention further provides for a filling of the interstices of the wicks with expanding powder or simply hot-melt in order to prevent a penetration of moisture into the cable.

According to the invention, the cable is formed by an association of reinforcement modules and optical modules, an external sheath holding or molding the modules.

The various module and external sheath assembling geometries form the object of several embodiments explained hereinafter.

In general, it is always the case that the external sheath is formed by a polymer material with a high Young's modulus, deposited by extrusion or by pultrusion on the assembly of modules.

The external sheathing material is preferably a high density polymer, of the polyethylene, polyamide, polyester, polyether-ether-ketone, polyether imide, polyether sulfone or similar type. Polyvinyl chlorides or polyolefines, both materials charged especially with beads and glass microfibers may also constitute the external sheath.

The sheathing material typically has a Young's modulus of 1000 MPa to 5000 MPa under the conditions of use in order to contribute to the yield strength of the cable.

Figure 2:
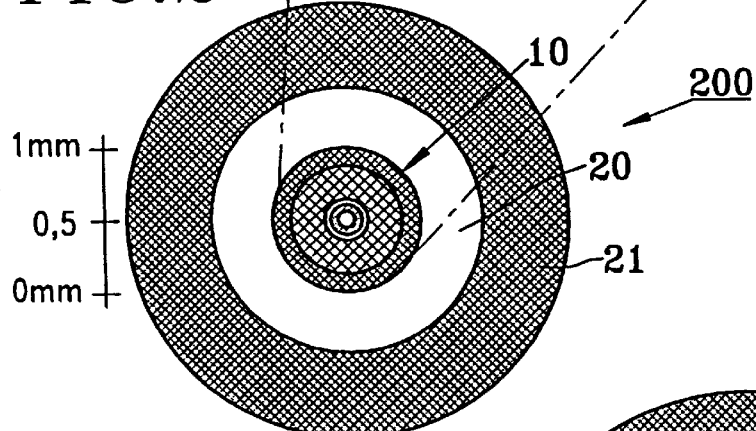
FIG. 2 shows a cross-sectional view of a concentric monofiber cable according to a first embodiment of the invention.

FIG. 2 illustrates a simple embodiment of a cable with optical fibers self-reinforced against compression according to the invention.

The monofiber cable 200, according to this first embodiment, comprises a single axial optical module 10, having the constitution explained here above with reference to FIG. 1. The optical module 10 is coated directly with fiber wicks forming a tubular flexible reinforcement module 20 according to the invention. The modules 10, 20 are finally molded in an external sheath 21.

According to a first non-restrictive exemplary embodiment, the tubular reinforcement module 20 has an internal diameter of 1.2 mm and an external diameter of 2.2 mm, the thickness of the microfiber wicks being then 0.5 mm. The external sheath 21, in this first example, has a thickness of 0.7 mm, giving a final cable diameter of 3.6 mm. Thus, a monofiber cable 200 is obtained with a yield strength of over 500 N measured for an elongation of 0.3%.

In a second exemplary embodiment of a monofiber cable 200, the tubular reinforcement module 20 has an internal diameter of 1.2 mm and an external diameter of 2 mm, the wick thickness being limited to 0.4 mm. The external sheath 21 has a thickness limited to 0.5 mm in this second example, giving a final cable diameter of 3 mm. There is then obtained a monofiber cable 200 having a yield strength of 500 N measured for an elongation of 0.6%. The cable made according to this second example has the advantage of being compact and light.

A lightening of the cable structure of this kind, with a reduction of 20 to 50% in the number of fibers and the area of cross-section actually occupied by the fiber wicks, may be applied whenever a fiber elongation of 0.6% is acceptable. The lightening of the cable structure with the reduction of the area of fiber wicks can be applied especially to the other embodiments here below.

Figure 3:
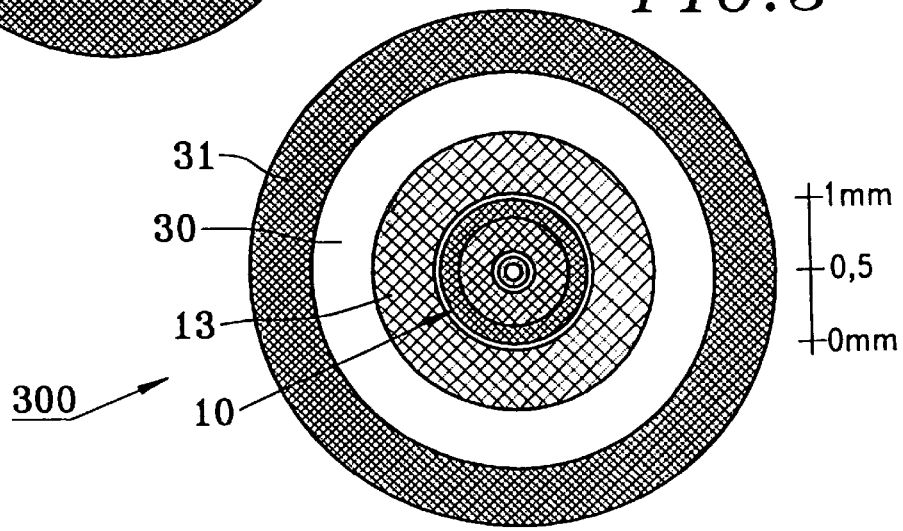
FIG. 3 shows a cross-sectional view of a concentric monofiber cable according to a second embodiment of the invention.

FIG. 3 shows a second embodiment in which a monofiber concentric cable structure 300 closely resembling the cable 200 is adopted.

Unlike the first embodiment, an intermediate tubing 13 is planned, according to the invention, between the axial optical module 10 and the peripheral reinforcement module 30, external sheath 31 similar to sheath 21 of FIG. 2. The tube 13 is formed by a plastic material chosen especially from among the polymers such as charged polyvinyl chlorides and polyolefines. The plastic material is preferably a flame-retardant material made, for example, by being treated with aluminum hydrate or any other fire-retardant material without any halogenide (chloride, fluoride or bromide) to prevent toxic discharges.

The plastic tube 13 has a wall thickness of about 0.5 mm. The tube 13 for example has an external diameter of 1.3 mm and an external diameter of 2.3 mm as shown in FIG. 3.

One advantage of the second embodiment is the excellent compressive strength and shear strength of the cable 300 obtained. The tubing 13 especially increases resistance to mechanical shock, radiation and physical/chemical corrosion. Such specific features make the cable 300 particularly suited for use in technical rooms and installations (tunnels, conduits, basements) and wiring on the front of buildings.

Depending on the above examples of sizing, it will be noted that a sheathed optical module 10 (diameter 1.2 mm) is freely inserted into the tube 13 (internal diameter 1.3 mm). This arrangement enables the optical module 10 to have scope for movement in expansion, sliding and even in shrinkage if it is planned to give it clearance during manufacture.

Furthermore, the final sheathing coat 5 of the optical module 10 is preferably formed by an anti-adhesive material in order to enable a sliding of the optical module into the tube or more generally into the cable. The anti-adhesive material may be in particular a polyamide, polyester, sulfone polyether, polyether ketone or polyether imide material. This final coating 5 that sheaths the module 10 may be flame-retardant if necessary.

FIG. 4 shows a third embodiment of a cable in which the modules have substantially coplanar axes.

According to the invention, a single flexible reinforcement module 40 with a cylindrical shape is positioned laterally and with a spacing in relation to associated optical modules.

FIG. 4A thus shows a monofiber cable 401 comprising a reinforcement module 40 and an optical module 10 molded in the external sheath 41. The module 40 and the module 10 are spaced out and the molding of the sheath has one or two longitudinal grooves 42 that are hollowed out along the median axis of spacing of the modules 10 and 40. An arrangement of this kind enables the easy separation of the optical module 10 and the reinforcement module 40 in domestic connections. Another advantage of such an arrangement is that, on an overhead portion, the cable 401 may be fixed by placing a tight clamp to the lateral reinforcement module 40 without damaging the optical module.

The groove 42 however is optional, for the sheath may have a full section, in particular a rectangular or ovalized section.

As a non-restrictive example of sizing, the cylinder of microfiber wicks constituting the reinforcement module 40 has a diameter of 1.5 mm, the optical module 10 having a diameter of 1.2 mm. The external sheath 4 made of high-density polyethylene has a thickness of over 0.4 mm. The cable obtained according to this example has a total width of 4.7 mm and a total thickness of 2.3 mm.

Thus, a cable 401 is obtained with a yield strength of over 500 N measured for an elongation of 0.3%.

FIGS. 4B and 4C illustrate two variants of cables with coplanar modules, one bifiber cable 402 illustrated in FIG. 4B and one tetrafiber cable 403 illustrated in FIG. 4C.

It is possible to use modules 40, 10, 10', 10", 10'" and an external sheathing 41 having the same size as in the example relating to the cable 401.

There is then obtained a cable 402 having a width of 5.7 mm and a yield strength of over 600 N with an elongation of 0.3%. The cable 403 has a width of 8.3 mm and an yield strength of over 750 N measured for an elongation of 0.3%.

One advantage of the cable obtained according to the third embodiment is its lightness.

According to the previous examples, the mass per unit length of the monofiber cable 401 is smaller than 8 g.m$^{-1}$ while the mass per unit length of the tetrafiber cable 403 is smaller than 12 g.m$^{-1}$, namely one-third of the mass per unit length of a small overhead electrical cable made of copper.

The optical modules 10, 10', 10", 10'" are preferably positioned side by side and a bonding 43 may be provided at their zone of contact to improve the assembling of the modules 10, 10', 10", 10'" with one another and if necessary with the sheath 41.

FIG. 5 illustrates a fourth embodiment of the invention in which several self-reinforced optical modules 10, 10' are embedded in a flexible reinforcement module 50, the assembly being covered with an external sheathing 51.

The optical modules 10 and 10' may be bonded for example by means of a fine layer of EVA type hot-melt, enabling the combined lengthening as well as the easy separation of the modules 10 and 10' when making domestic wirings and connections.

The reinforcement module 50 surrounds and fills the interstices between the optical module to obtain an ovalized section with a thickness for example of over 0.3 mm for the fiber wicks. The external surface of the reinforcement module 50 is covered with an external sheath having, for example, a thickness of 0.5 mm.

The cable 500 thus formed has a section with a big axis D of 4 mm and a small axis E of 2.8 mm. Thus, a yield strength of over 600 N is obtained for an elongation of 0.3%.

One advantage of the cable 500 is its simplicity of manufacture and use.

FIG. 6 shows bifiber cables according to a fifth embodiment in which the two self-reinforced optical modules 10 and 10' are associated with one or two flexible reinforcement modules 60 and 60'. Unlike the cable 500, all the modules 10, 10', 60, 60' and 63 of the cables 601, 602 and 603 are cylindrical and joined in a bundle, leaving interstices beneath the external sheath 61.

As can be seen in FIG. 6A, the cable 601 has a cylindrical cross-section generated by revolution, the external sheath 61 forming a circular ring.

The bundle positioned in the opening of the cable 601 has two optical modules 10 and 10' that are in contact or bonded and two reinforcement modules 60 and 60' on either side of the optical modules. With for example optical modules having a diameter of 1.2 mm, reinforcement modules having a diameter of 1 mm and a sheath having a thickness of 0.5 mm, there is obtained a cable 601 having a diameter of 3.4 mm and having a yield strength of over 600 N for an elongation of 0.3%.

Lighter cables may be obtained by reducing the section effectively occupied by the reinforcement module fibers, as shown in FIGS. 6B and 6C.

FIG. 6B shows a cable 602 comprising, unlike the cable 601, two smaller reinforcement modules and one external sheath 62 with an ovalized section.

With, for example, two cylindrical reinforcement modules having a diameter of 0.6 mm and a sheath with a thickness of 0.5 mm, there is obtained a cable with a yield strength of 600 N measured for an elongation of 0.6%.

FIG. 6C shows a cable 603 with an ovalized section in which, unlike the cables 601 and 602, the two reinforcement modules 60 and 60' have been replaced by a single reinforcement module 63.

With a bundle comprising two optical modules 10, 10' and a round reinforcement module 63 having, for example, a diameter of 1 mm, covered with an ovalized sheath having a thickness of 5 mm, there is obtained a cable having a yield strength of 600 N measured for an elongation of 0.6%.

Figure 7:
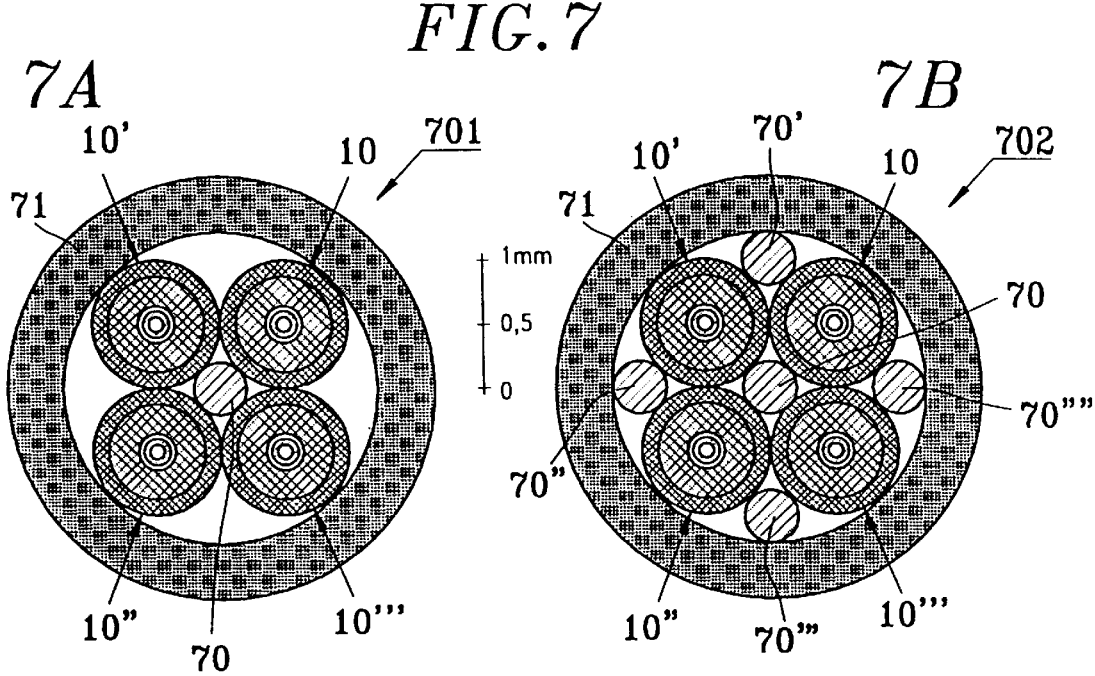
FIG. 7 shows cross-sectional views of cylindrical tetrafiber cables according to a sixth embodiment of the invention, two variants being shown in FIGS. 7A and 7B.

FIG. 7 shows tetrafiber cables 701 and 702 made according to a sixth embodiment of the invention. The cables 701 and 702 also have a bundle of self-reinforced optical modules 10 and flexible reinforcement modules 70 covered with a cylindrical sheath 5 that encircles the bundle in leaving interstices.

The cable 701, shown in FIG. 7A, comprises a bundle with a single central cylindrical reinforcement module 70 and four optical modules 10, 10', 10" and 10'", positioned evenly around the reinforcement module 70.

The cable 701, shown in FIG. 7B, is a variant with a bundle having five reinforcement modules 70, 70', 70", 70'" and 70"". Four reinforcement modules 70' to 70"" are added on the periphery of a bundle similar to 70, 10, 10', 10", 10'" at the cable 701. A cable of this kind with five reinforcement modules 70 to 70"" has high yield strength.

With flexible reinforcement modules 70 having a diameter of 0.5 mm and a sheath of 5 mm, there is thus obtained a cable 701 having a yield strength of over 700 N for an elongation of 0.6% and a cable 702 having a yield strength of over 700 N for an elongation of 0.3%.

Figure 8:
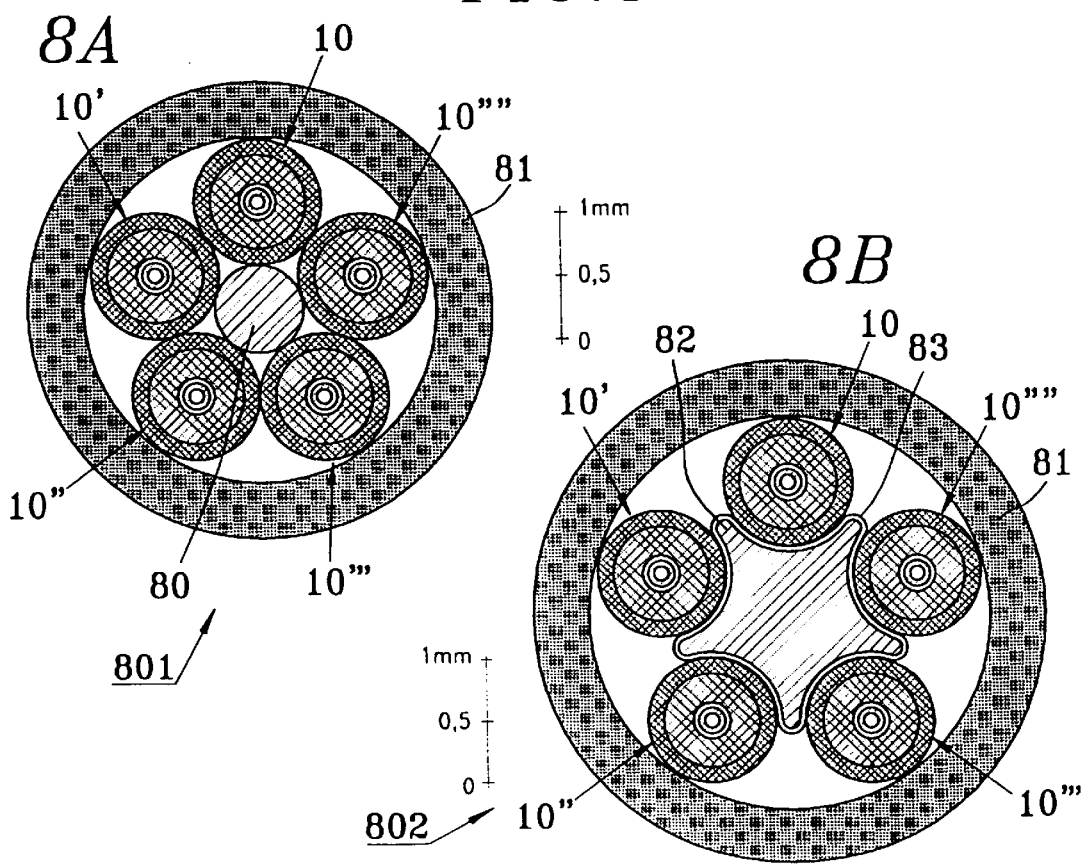
FIG. 8 shows cross-sectional views of pentafiber cables according to the invention, a pentafiber variant of the sixth embodiment being illustrated in FIG. 8A, a pentafiber cable according to a seventh embodiment being illustrated in FIG. 8B.

FIG. 8 shows pentafiber cables 801 and 802 made according to the invention.

The cable 801, illustrated in FIG. 8A, like the cable 701, which is the object of the sixth embodiment, has a bundle with a single central reinforcement module 80 and fiber optical modules 10 to 10"".

The cable 802, which is the object of a seventh embodiment, comprises an central extra filling of reinforcement wicks in the form of a flexible reinforcement module 82. The core 82 of the bundle is therefore formed by a filling of wicks of microfibers made of aramide or another material around which the five optical modules 10 to 10"" are positioned evenly.

One advantage of the cable structure 802 is its high crushing strength.

Preferably, it is planned to cover the surface of the reinforcement module 82 with a layer 83 of adhesive material to fixedly join the modules 82 and 10 to 10"". The adhesive layer 83 has a small thickness, of about 50 to 200 microns for example. The adhesive material is preferably formed by hot-melt based on vinylacetate ethylene, polyamide, neoprene or nitrile rubber.

An arrangement of this kind has the additional advantage of enabling high deformation of the cable during the installation before the modules are subjected to mechanical action.

By way of an exemplary embodiment, the extra filling of fibers constituting the reinforcement module 82 has a radius varying between 0.5 to 1.1 mm, the cable having a diameter of 4.8 mm.

Finally, FIG. 9 shows an eighth embodiment of the invention in which the optical modules 10 are positioned on the periphery of a central rod 100 in grooves hollowed out on a surface of the rod 100. The rod is preferably formed by a thermoplastic or thermo-hardening material based for example on polyolefine, polyamide or polyesters.

As can be seen in FIG. 9A which represents a tetrafiber cable 901, the four grooves 110 to 110'" preferably have rounded bottoms and the rod does not have any central reinforcement. Indeed, a tube-shaped flexible reinforcement module covers the rod 100 after the insertion of four optical modules 10, 10', 10" and 10'" in the grooves 100, 110', 110" and 110'" respectively.

As a non-restrictive example, the thermoplastic rod 100 has a diameter of 3.8 mm, the grooves being adapted to receive the optical modules 10 with a diameter of 1.2 mm.

The central frame of the rod 100 with the bundle of optical modules 10 is covered with a reinforcing module 90 formed by a layer of fibers having a thickness of 0.3 mm and finally an external sheath with a thickness of 0.7 mm. A cable of this kind with a diameter of 5.8 mm has a yield strength of over 700 N for an elongation of 0.3%.

One advantage of such a frame is the great crushing strength conferred on the cable.

FIG. 9B shows an octofiber cable 902 according to the eighth embodiment of the invention with a structure similar to that of the cable 901.

As a non-restrictive exemplary embodiment, the cable 902 has a central rod 100 with a diameter of 5.5 mm, eight self-reinforced optical modules 10 with a diameter of 1.2 mm, one flexible reinforcing module 90 formed by a layer of fiber wicks with a thickness of 0.25 mm and finally an external sheath with a thickness of 0.7 mm.

A cable 902 of this kind has a diameter of 7.4 mm and a yield strength of over 800 N corresponding to an elongation of 0.3%.

In conclusion, the optical cable structure planned by the invention can be subdivided into eight nonrestrictive embodiments and has the advantage of combining flexibility and high tensile and compressive strength.

It also has substantial advantages of lightness, its mass per unit length in particular being smaller than that of an electrical copper cable. A major advantage of the embodiments of cables according to the invention is the ease of manufacture. Consequently, the cost of manufacture is very limited.

Furthermore, the installation of such cables is easy. Indeed, this light structure requires low tension of overhead installation suited to the commonly used clamps. Furthermore, the modular structure enables the easy separation of the optical modules designed for each subscriber.

The installation of optical cables according to the invention is thus made as simple as the installation of electrical wires and can be done rapidly by only one technician.

The characteristics and advantages of this kind of the optical cable according to the invention are particularly suitable for domestic and multiple-purpose wiring.

Other applications, variants and characteristics of the invention shall appear to those skilled in the art without going beyond the scope of the invention and the following claims.

What is claimed is:

1. A modular optical transmission cable comprising several modules molded in an external sheath, the cable comprising at least one optical module self-reinforced against compression associated with at least one flexible reinforcement module to have high flexibility combined with high compressive strength, each optical module comprising:
    a sheathed optical fiber, coated with:
    an intermediate decoupling layer, and with
    a rigid shell forming a microcarrier,
    wherein the reinforcement module or modules are constituted by wicks of microfibers not hardened by means of resin, the reinforcement module or modules being made of a filling of wicks occupying an effective area of cross-section of the cable.

2. A cable according to claim 1, wherein the optical module or modules and the reinforcement module or modules occupy determined positions in the cable.

3. A cable according to claim 2, wherein a reinforcement module is made of fibers or a mixture of fibers chosen from a group comprising the fibers made of aramide, carbon, ceramics, polymer and E, R and S type glass.

4. A cable according to claim 2, wherein the reinforcement module wicks are covered on the surface with a hot-melt type adhesive material, based especially on vinylacetate ethylene, polyamide, neoprene or nitrile rubber.

5. A cable according to claim 2, wherein the reinforcement module wicks have interstices filled with expanding powder or hot-melt in order to prevent a penetration of moisture.

6. A cable according to claim 1, wherein an optical module furthermore comprises a final coating of anti-adhesive material with a thickness of about 100 to 200 microns, in order to enable the slipping of the optical module into the cable.

7. A cable according to claim 6, wherein the final anti-adhesive coating is made of a material chosen from a group comprising the materials polyamide, polyester, polyether sulfone, polyether ketone and polyether imide.

8. A cable according to claim 1, comprising at least one fire-retardant sheath and/or one fire-retardant coating.

9. A cable according to claim 1, wherein the external sheath is made of a polymer having a Young's modulus of about 1000 MPa to 5000 MPa under the conditions of use.

10. A cable according to claim 1, wherein the external sheath external is made of a high-density polymer chosen from a group of polymers comprising polyethylene, polyamide, polyester, polyether-ether ketone, polyether imide, polyether sulfone, polyolefine charged with glass beads or microfibers, polyvinyl chloride charged with glass beads or microfibers and especially polymers charged with glass beads or microfibers.

11. A cable according to claim 1, wherein an optical module is fitted into a polymer tube, the tube having a wall thickness of about 200 to 1000 microns.

12. A cable according to claim 1, comprising an optical module inserted into a tubular reinforcement module.

13. A cable according to claim 1, comprising a bundle of optical modules embedded in a reinforcement module.

14. A cable according to claim 1, comprising a framework formed by a thermoplastic rod, a bundle of optical modules being laid out in cavities in the rod.

15. A cable according to the claim 14, comprising a bundle of optical modules inserted into a tubular reinforcement module.

16. A cable according to claim 1, comprising a cylindrical bundle with reinforcement and optical modules.

17. A cable according to claim 1, comprising modules having substantially coplanar axes, the external sheath forming a flat ribbon, comprising a single reinforcement module laid out laterally and having a spacing with respect to the associated optical modules in order to fasten the cable by clamping to the lateral reinforcement module.

* * * * *